United States Patent [19]

Wiblyi et al.

[11] Patent Number: 4,805,919
[45] Date of Patent: Feb. 21, 1989

[54] BEARING SEAL

[75] Inventors: John M. Wiblyi; John Rizzi, both of Bristol, Conn.

[73] Assignee: Wasley Products, Inc., Plainville, Conn.

[21] Appl. No.: 72,926

[22] Filed: Jul. 14, 1987

[51] Int. Cl.⁴ .................. F16C 33/76; F16J 15/32
[52] U.S. Cl. .................. 277/152; 277/95; 277/169; 277/212 R; 277/214; 277/215; 277/DIG. 6; 384/477; 384/481; 384/485; 384/486
[58] Field of Search ............ 277/152, 169, 205, 214, 277/DIG. 6, 212 R, 212 F, 212 C, 215, 95; 384/147, 151, 484, 485, 486, 911, 477, 481, 482, 139, 140

[56] References Cited

U.S. PATENT DOCUMENTS

| | | |
|---|---|---|
| 2,038,010 | 4/1936 | Smith . |
| 2,077,881 | 4/1937 | Gits . |
| 2,188,855 | 1/1940 | Chievitz .................. 277/208 X |
| 2,394,012 | 2/1946 | Rayburn .................. 277/94 |
| 2,615,734 | 10/1952 | Parry . |
| 2,757,052 | 7/1956 | Spurgeon .................. 277/94 X |
| 2,757,988 | 8/1956 | LeCourse . |
| 2,830,858 | 4/1958 | Moorman et al. . |
| 3,449,029 | 6/1969 | Smith .................. 384/482 |
| 3,473,856 | 10/1969 | Helms .................. 384/485 X |
| 3,572,857 | 3/1971 | Hasegawa .................. 384/486 X |
| 3,700,296 | 10/1972 | Bugmann .................. 384/484 |
| 3,700,297 | 10/1972 | Fickenwirth et al. . |
| 3,810,636 | 5/1974 | Gorski . |
| 3,813,102 | 5/1974 | Derman . |
| 3,957,278 | 5/1976 | Rabr .................. 384/484 X |
| 4,219,204 | 8/1980 | Pippert .................. 277/230 X |
| 4,309,063 | 1/1982 | Weis . |
| 4,355,992 | 10/1982 | Ladin .................. 277/95 X |
| 4,428,629 | 1/1984 | Colanzi et al. .................. 384/147 |
| 4,611,931 | 9/1986 | Brandenstein et al. .................. 384/484 |
| 4,639,149 | 1/1987 | Bras et al. .................. 384/484 X |
| 4,650,195 | 3/1987 | Dreschmann et al. .................. 277/152 X |
| 4,660,997 | 4/1987 | Brandenstein et al. .................. 384/484 X |

FOREIGN PATENT DOCUMENTS

| | | | |
|---|---|---|---|
| 1162645 | 2/1964 | Fed. Rep. of Germany | 384/484 |
| 1939597 | 2/1970 | Fed. Rep. of Germany | 384/484 |
| 1243812 | 9/1960 | France | 384/484 |
| 1313626 | 11/1982 | France | 384/484 |
| 811356 | 4/1959 | United Kingdom | 384/484 |
| 1228971 | 4/1971 | United Kingdom | 384/484 |

*Primary Examiner*—Allan N. Shoap
*Attorney, Agent, or Firm*—McCormick, Paulding and Huber

[57] ABSTRACT

A novel seal for transversely sealing a bearing includes a seal body formed from a stiff, homogeneous material. The seal body is adapted to be received at outer race groove and inner race land. The seal is characterized by a set of annular hinges formed in the seal body in such a manner that the otherwise rigid seal will dynamically compensate for dimensional differences between the seal and the bearing races, thereby maintaining the seal integrity.

12 Claims, 3 Drawing Sheets

BEARING SEAL

TECHNICAL FIELD

This invention relates to bearing seals and more particularly to bearing seals fabricated from a homogeneous material that have a geometry which compensates for environmentally induced expansion and contraction.

BACKGROUND OF THE INVENTION

Lubricant seals for ball, needle and other types of bearings are well known in the art. Bearings are typically cylindrical, and therefore have annular end seals that are substantially disposed in a single plane. Each seal tightly fits into a groove or land in the bearing inner and outer races.

In general, bearing seals must be sufficiently flexible to enable the seal to be positioned in the bearing races without permanent deformation. A seal must compensate for any dimensional changes in the bearing produced by its thermal environment. Under all conditions the seal must remain substantially in one plane, and not either bow out from or sag in toward the bearing center. Also, the seal must be as simple as possible in design to reduce manufacturing costs.

Existing bearing seals usually have a composite structure which enables them to have both the required flexibility and rigidity. In general, these composite bearing seals include an annular metal band encompassed by rubber. The metal band provides the rigidity to prevent sagging or bowing of the seal, while the rubber provides the necessary flexibility, especially at the seal's inner and outer edges, where the seal is received by the bearing race grooves or lands. A bearing seal of this type is detailed in U.S. Pat. No. 4,650,195. The seal disclosed therein is an anti-friction seal for a bearing. The seal is a composite of a rigid material with a flexible annular element whose construction is similar to the well known metal rubber metal composite bearing end seal discussed above. Other known bearing seals have a rigid-compliant material composite structure but are additionally characterized by a very complex construction. Note the bearing seal of U.S. Pat. No. 4,309,063 wherein first and second annular members are slideably disposed about one another.

Bearing seals made from a single material include the seal of U.S. Pat. No. 2,038,010. Disclosed therein is a ball bearing sealed by means of a steel sealing ring which is snapped into a groove in the outer bearing race and land formed in the inner race. The sealing ring is characterized by a compressible corrugation which is used to initially position the ring in the bearing. The geometry of the corrugation groove is such that the bearing seal deforms out of the plane of the seal to minimize the permanent deformation which would otherwise occur if the groove was not present when the seal was positioned in the bearing.

The ball bearing seal of the '010 patent is comprised of the same material as the remaining bearing components. Consequently, the seal retains its integrity over a wide range of bearing temperatures. Compensation for thermal expansion is not necessary since the thermal expansion coefficients of the materials used for both the bearing and the seal are the same. The bearing seal taught in the '010 patent would be of little use in those applications where the materials which comprise the bearing and the seal are dissimilar, or where out of plane bearing seal deformation is not acceptable.

In the past, bearing seals have seldom been constructed of only a single material because each material suitable for use as a bearing seal does not simultaneously possess (1) rigidity needed to prevent out of plane deformation, (2) the flexibility needed for strain-free bearing assembly and, (3) the compliance needed to compensate for differences in the expansion rates between the various bearing and seal materials. For example, U.S. Pat. No. 3,810,636 discloses a bearing seal made solely from plastic that is characterized by recesses extending parallel to the seal's major surfaces. The recesses improve the seal flexibility but must also provide more than one sealing surface. The additional seal flexibility is necessary to prevent cracking during assembly with the bearing. The additional surface helps compensate for differences in thermal expansion between the plastic and the metal of the bearing.

Other known bearing seals are often designed for a specific application, such as the bearing seal disclosed in U.S. Pat. Nos. 3,700,297; 2,077,881 and 2,830,858. These and other known bearings are not easily adapted for use with wide range of bearings. Any attempt to utilize these seals with other bearings would, in general, undesirably require bearing manufacturers to modify construction of their bearings to conform with a particular seal. To be successful in the marketplace, a bearing seal must be easily adapted to a wide range of bearings without requiring any changes in the design or manufacture of the bearings themselves.

SUMMARY OF THE INVENTION

It is an object of the present invention to provide a seal which is comprised of a homogeneous material. It is another object of the present invention to provide a bearing seal capable only of in-plane, radial deformation that provides strain-free assembly and compensation for thermal expansion and contraction. It is another object of the present invention to provide for a bearing seal which is compatible with existing bearing designs.

According to the present invention, a seal for transversely sealing a volume interior to an element surface includes a seal body of a select thickness formed from a rigid or stiff material. The seal body has opposed major surfaces with a minor surface transverse thereto. The seal body minor surface is adapted to receive the element surface at an interface formed therein. Also included is a compensatory apparatus formed in the seal body for providing dynamic contractive and expansive displacement of a first portion of said seal body relative to the remainder thereof in a direction substantially parallel to said major surfaces in order to compensate for dimensional differences between the seal body and the element.

According to another aspect of the present invention, a seal for sealing a cylindrical bearing that has an inner race with a land and outer race with a groove comprises a annular seal body that has opposed major surfaces formed from homogeneous material of a selected thickness. A seal body interface is formed at the outer and inner seal body peripheries and is adapted to receive the outer race groove and inner race land, respectively. A first compensatory hinge set is also included, and comprises first and second annular hinges formed in the seal body displaced one from another. The first hinge has a recess extending into the seal body opening toward the first major surface and the second hinge has a recess extending into the seal body opening toward the second major surface. The dimensional compensation hinge set provides dynamic displacement of a first portion of the seal body relative to the remainder in a direction substantially parallel to the major surfaces to compensate for dimensional differences between the seal body and the bearing races.

DESCRIPTION OF THE PREFERRED EMBODIMENT

Figure 1:
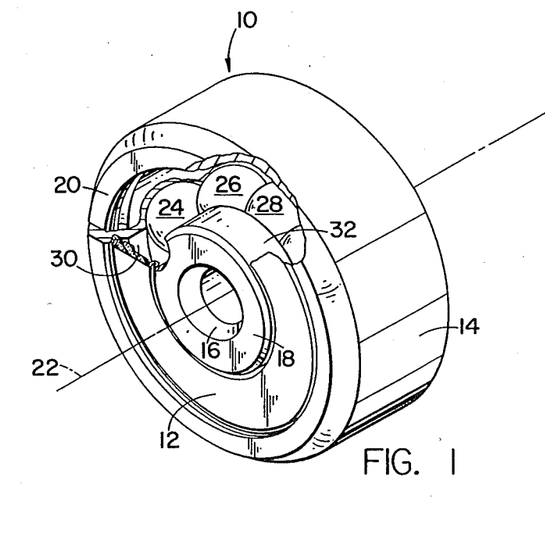
FIG. 1 is a perspective illustration of a bearing having a seal provided according to the present invention.

Referring now to FIG. 1 there is illustrated, in perspective, a ball bearing 10 having a seal 12 provided according to the present invention. The bearing illustrated in the preferred embodiment is a conventional radial ball bearing. Alternatively, the bearing 10 could comprise a roller, needle, linear or other type of bearing which is characterized by a transverse seal for keeping out dirt and moisture while maintaining an internal lubricant.

The bearing 10 includes an outer race 14 concentric with an inner race 16. The cylindrical inner and outer races are terminated in end faces 18 and 20, respectively, which are substantially coplanar and perpendicular to a longitudinal axis 22 of the bearing. The seal 12 is also generally planar. Typically, the outer and inner races are comprised of steel or other metal. Portions of the outer race 14 and seal 12 have been removed from the illustration to reveal a plurality of balls such as balls, 24, 26 and 28. As is conventional, the inner surface 30 of outer race 14 and outer surface 32 of inner race 16 are formed with registered channels to position the balls. As detailed hereinafter with respect to FIG. 2, the seal 12 abuts a land on the inner race and, is received in an outer race groove when assembled with the bearing.

The fundamental purpose of the bearing seal is to contain the lubricant within the interior volume between the inner and outer races while simultaneously preventing dirt, moisture or other contaminants from entering that volume. The integrity of the seal can be breached in a number of ways. Of primary concern is the permanent deformation which may occur when the bearing is first inserted onto the seal. If the bearing seal is not sufficiently flexible, the seal body will be warped or otherwise deformed and a proper, permanent seal rendered impossible.

In addition, the integrity of the seal must be maintained over a broad range of temperatures. The bearing material is typically steel, and unless the bearing seal material is comprised of steel or another material having the identical coefficient of thermal expansion, the amount of thermal expansion and contraction the bearing and bearing seal undergo will be different. Consequently, a permanently effective seal can only be maintained over a narrow temperature. Once outside that narrow temperature range, a bearing seal will either have dimensions that are too large, resulting in a swelling or bowing of the seal, or too small, resulting in a bearing seal which will fall out. It is also most important that the bearing seal maintain its substantially planar shape given high precision and close tolerances required of bearings in many applications.

In sum, a bearing seal must possess sufficient flexibility to avoid permanent deformation when assembled with the bearing, provide dynamic compensation for differential thermal expansion and contraction to maintain the integrity of the seal over a broad range of temperatures while simultaneously being or sufficient rigidity to prevent out of plane deformation. With known bearing seals most often characterized by a complex composite structure, it is not unusual for a bearing seal to comprise a significant portion of the overall cost of the bearing.

Figure 2:
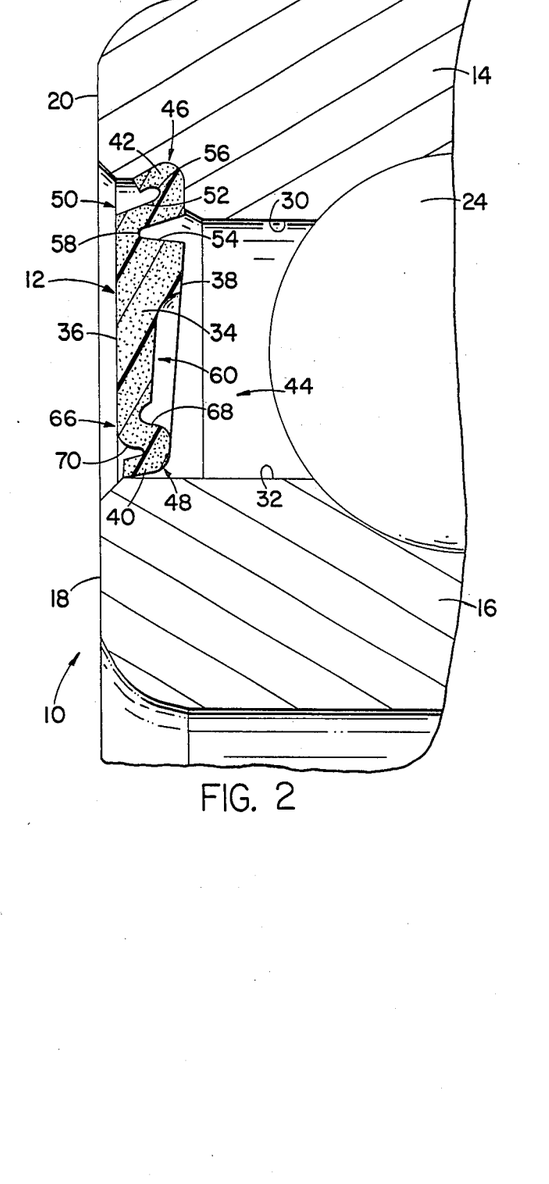
FIG. 2 shows, in section, a portion of the bearing of FIG. 1 detailing the bearing seal.

FIG. 2 is a sectioned illustration of a portion of the bearing of FIG. 1 detailing the bearing seal. The bearing seal 12 includes a seal body 34 that is substantially annular. The seal body has opposed major surfaces 36 and 38 bound by minor surfaces 40 and 42 at the inner and outer seal peripheries, respectively. Also illustrated in FIG. 2 is a portion of ball 24. The bearing seal maintains a lubricant in space 44 in the interior of the bearing. As detailed above, the inner and outer races are cylindrical and they terminate in the outer and inner race faces 18 and 20 which are substantially perpendicular to the longitudinal axis of the bearing.

As is conventional, the outer race has a groove 46 formed in its inner surface 30 adapted to receive outer peripheral surface 42 of the bearing seal. Similarly, the inner race has a land 48 formed in the outer surface 32 adapted to receive inner peripheral surface 40 of the seal. Mirror peripheral surfaces 40 and 42 interface with the inner race land and outer race groove, respectively. The inner race land can be of any of the type known in the art. In the embodiment of FIG. 2 the land is substantially parallel to the inner race outer surface.

A bearing seal provided by the present invention is homogeneous in construction and comprises a stiff material, such as a plastic or a thermoplastic mixture of polyester elastomer such as DuPont Hytrel$^R$) and an inert material, such as glass or carbon fibers or talc. An example of a glass fiber fortified polyester elastomer is marketed by the LNP Engineering Plastics Company under the Thermocomp "YF" trademark. It is preferable that the material be comprised of between 30 and 40% glass fiber and an unfortified polyester elastomer. Properties of a certain material which can be used with the present invention are summarized in the table below.

|  | UNITS | YF-1006 30% GLASS FIBER |
|---|---|---|
| (GENERAL) | | |
| Specific Gravity | in./in. | 1.42 |
| Mold Shrinkage, ⅛" | in./in. | .004 |
| Mold Shrinkage, ¼" | % | .005 |
| Water Absorption, 24 hrs. | % | .017 |
| (MECHANICAL) | | |
| Tensile Strength | psi | 10,000 |
| Tensile Elongation | % | 8–10 |
| Flexural Strength | psi | 13,000 |
| Flexural Modulus | psi | 320,000 |
| Izod Impact Strength | | |
| Notched, ¼" | ft.lb./in. | 5.0 |
| Unnotched, ¼" | | 20 |
| (THERMAL) | | |
| Heat Distortion Temp. @ 66 psi | °F. | 385 |

|  | UNITS | YF-1006 30% GLASS FIBER |
|---|---|---|
| @ 264 psi | | 340 |
| Thermal Expansion | | $3.0 \times 10^{-5}$ |
| Flammability | U.L. Subj. 94 | |

For a bearing seal provided by the present invention comprised of polyester elastomer fortified with 30% glass fiber the following dimensional changes are exemplary.

|  | Outside Diameter | Inside Diameter |
|---|---|---|
| Room Temp | 1.374 | 0.960 |
| −109° | 1.365 | 0.961 |
| 200° F. | 1.381 | 0.963 |
| Dimensional Change | 0.016 | 0.003 |

The homogenity which characterizes a bearing seal provided according to the present invention marks a point of departure over the prior art. The simple structure of the present bearing seal is in sharp contrast to the expensive, complex structure of known bearing seals and can be produced for less than one-half of the cost of rubber-metal composite seals.

In the preferred embodiment, the bearing seal outer periphery is configured to conform to the outer race groove. Since the bearing seal material is not compliant or flexible, as is the rubber used in existing bearing seal designs, there is little or no "give" to allow for non-permanent deformation upon assembly with the bearing and to provide compensation for thermally induced expansion and contraction of the bearing. Consequently, if the bearing seal was constructed with an existing geometric configuration, the bearing seal would be useless.

However, a bearing seal provided according to the present invention is characterized by a first compensatory hinge set 50 which provides the necessary flexibility and allow only inplane, radial compensatory movement of an outer portion of the seal body that includes the first hinge set relative to an inner portion. The compensatory hinge set includes first and second hinges 52 and 54. The hinges are annular, with the first hinge formed in the seal body radially displaced from the second hinge. The first hinge has a recess extending into the seal body opening towards the first major surface from a hinge point 56, while the second hinge has a recess extending into the seal body opening towards the second major surface from a hinge point 58. In the preferred embodiment, the hinge points are displaced from one another toward the opposing major surfaces by an amount which is at least as great as one half of the seal body thickness. In FIG. 2, the hinge point 56 is displaced closer to major surface 38 than to major surface 36, while the hinge point 58 is oppositely positioned closer to major surface 36 than to major surface 38. The compensatory hinge set will allow for movement in a direction substantially parallel to the first and second major surfaces between the seal body inner and outer portions. Consequently, out of plane distortion or movement will be minimized. Bowing is not otherwise possible because of the stiff or rigid nature of the bearing seal material.

The bearing seal is assembled in a conventional manner with the outer peripheral surface being inserted into the outer race groove and the inner periphery being pressed along the inner race to the inner race land. The bearing seal will deform as described hereinabove and experience some compression at the hinges. When the bearing is heated the overall dimensions of the bearing will change, including the distance between the inner and outer race surfaces. In response, the compressed bearing seal will open slightly at the hinges, thereby maintaining the seal integrity. Similarly, when the bearing cools, the distance between the race surfaces will decrease. As a result, the bearing seal will compress along the hinges, again without bowing. As shown in FIG. 2, recess 60 is formed in the second major surface facing the interior of the bearing. This recess allows for the desired interior clearance.

Figure 3:
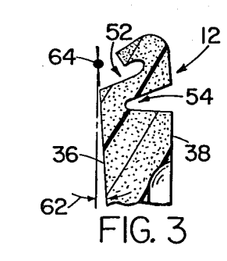
FIG. 3 is a sectional illustration of the outer portion of the seal of FIGS. 1 and 2.

In the preferred embodiment, the opposed major surfaces of the bearing seal are not quite parallel to each other or to the plane which contains the race end faces as shown in a simplified schematic diagram in FIG. 3. FIG. 3 illustrates the outer portion of seal 12 wherein outer major surface 36 deviates from an exactly parallel relationship to inner major surface 38 by an angle 62. As shown in FIG. 3, the angle has been exaggerated for purposes of illustration. In the preferred embodiment angle apex 64 is located toward the outer race and the magnitude of angle 62 is approximately 4 degrees 15 minutes. Those skilled in the art, will note that the bearing seal having an outer surface inwardly disposed at such an angle, has an improved capability of maintaining its position on the land, thereby ensuring seal integrity.

Also illustrated in FIG. 2 is a second hinge set 66 of hinges 68 and 70. The second hinge set is configured in a manner similar to the first hinge set but configured to be generally proximate to inner peripheral surface 40. The second hinge set is optional, and provides additional compensatory movement as is needed. Moreover, the second hinge set illustrated in FIG. 2 is used to help locate the inner periphery of the bearing seal on the inner race land. Those skilled in the art will note that a properly configured hinge set in combination with the peripheral surface will impart to the bearing seal an inwardly directed force to aid in maintaining the seal against the land. In the embodiment of FIG. 2, the seal minor surface 40 has an inwardly opening curved geometry which only narrowly contacts the land which, in combination with the second hinge set 66, urges the surface in and against the land.

Figure 4:
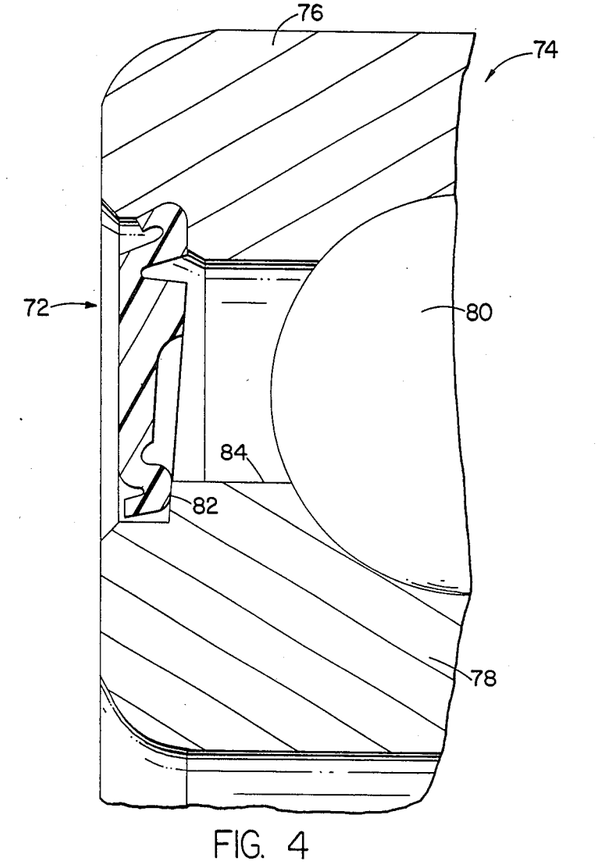
FIG. 4 is a sectional view of a portion of a bearing with an alternative embodiment of the bearing seal of FIG. 2.

FIG. 4 contains a sectional illustration of an alternative embodiment 72 of the bearing seal of FIG. 2. It is well known that bearings have inner races with lands which can be substantially parallel to the race outer surface (shaft wipe) or substantially perpendicular thereto (face wipe). In FIG. 4 there is seen a portion of a bearing 74 having an outer race 76 and an inner race 78, with a ball 80 therebetween. The bearing is transversely sealed by seal 72. The bearing seal is similar to seal 12 of FIGS. 1 and 2, in all respects, except that the seal is adapted to be received at land 82 of inner race 78 which is substantially perpendicular to outer surface 84 of the inner race. The bearing seal 72 is an example of a "face wipe" type bearing seal.

Similarly, although the invention has been shown and described with respect to a best known embodiment thereof, it should be understood by those skilled in the art that various other changes, omissions and additions thereto may be made therein without departing from the spirit and scope of the invention.

We claim:

1. A seal apparatus for transversely sealing a volume interior to a pair of opposing elements having generally axially extending element surfaces one of said elements having a first coefficient of thermal expansion and being capable of dynamic contractive and expansive movement, said elements defining a radial space therebetween with a pair of parallel radial planes extensions across said space said seal apparatus comprising:

a annular seal body having a second coefficient of thermal expansion formed from a uniform, stiff, single piece of material, said seal body having an inner peripheral end portion and an outer peripheral end portion and having a substantially rigid, and nonflexible, intermediate body portion interposed between said inner peripheral end portion and said outer peripheral end portion said end portions each having a part thereof located substantially on said pair of parallel radial planes extending across said radial space;

said seal body having opposed first and second major surfaces with each major surfaces axially facing and each defining at least one radial plane, and two minor surfaces extending generally transversely to said first and second major surfaces, said two minor surfaces each being respectively included within each of said inner and outer peripheral end portions;

said seal body minor surfaces each having an elongate dimension in the radial direction with respect to said radial space substantially less than the elongate dimension in said radial direction of each of said major surfaces;

one of said minor surfaces being secured to one of the element surfaces and said intermediate body portion having a substantially greater radial dimension than that of either of said peripheral end portions to substantially preclude seal body seal body deformation of the entire seal body axially out of any radial plane defined by any portion of said major surfaces one of said outer and inner peripheral end portions having a first substantially annular hinge in said seal body formed by a groove extending substantially axially inwardly from said first major surface, said first hinge being positioned closer to said second major surface than to said first major surface a second substantially annular hinge in aid seal body formed by a groove extending substantially inwardly form said second major surface, said second annular hinge being positioned closer to said first major surface than to said second major surface said first and second hinge portions being on the same end portion said intermediate body portion being free of hinges; and said first and second hinges providing contractive and expansive movement of said one of said inner and outer peripheral end portions of said seal body relative to the intermediate body portion primarily in a direction substantially parallel to said elongate dimension of said major surfaces to compensate for dimensional differences between said seal body and the element induced by the difference between said first and second coefficients of thermal expansion, thereby maintaining seal integrity.

2. The apparatus of claim 1 wherein said material is a homogeneous thermoplastic.

3. The apparatus of claim 2 wherein said homogenous material comprises a mixture of an elastomer and an inert filler.

4. The apparatus of claim 2 wherein said homogenous material comprises a thermoplastic mixture of polyester elastomer and glass fibers.

5. The apparatus of claim 1 wherein each hinge is substantially perpendicular to the direction of said movement.

6. The apparatus of claim 1 wherein said material comprises a plastic.

7. The apparatus of claim 1 wherein said seal body first major surface is disposed at an angle with respect to said second major surface.

8. The apparatus of claim 7 wherein said angle is approximately 4 degrees 15 minutes.

9. The bearing seal of claim 1 further including third and fourth radially offset annular hinges formed in the other of said outer and inner peripheral end portions of said seal body, said third hinge having a recess opening toward said first major surface, said fourth hinge having a recess opening toward said second major surface.

10. The bearing seal of claim 9 wherein said material is thermoplastic.

11. The bearing seal of claim 10 wherein said material is a thermoplastic mixture of an elastomer and an inert filler.

12. The bearing seal of claim 11 wherein said thermoplastic mixture comprises polyester elastomer and glass fibers.

* * * * *

UNITED STATES PATENT AND TRADEMARK OFFICE
CERTIFICATE OF CORRECTION

PATENT NO. : 4,805,919
DATED : February 21, 1989
INVENTOR(S) : John M. Wiblyi and John Rizzi It is certified that error appears in the above-identified patent and that said Letters Patent is hereby corrected as shown below:

Column 2

Line 59, please delete "a" and substitute --an--.

Column 3

Line 39, after the first occurrence of "balls" please insert --,--.

Column 4

Line 41, after "elastomer" please insert --(--.

Column 5

Line 44, please delete "allow" and substitute --allows--.

Column 6

Line 26, after "embodiment" please insert --,--.
    Line 29, after "art" please delete --,--.

UNITED STATES PATENT AND TRADEMARK OFFICE
CERTIFICATE OF CORRECTION

PATENT NO. : 4,805,919
DATED : February 21, 1989
INVENTOR(S) : John M. Wiblyi and John Rizzi It is certified that error appears in the above-identified patent and that said Letters Patent is hereby corrected as shown below:

In the Claims

Claim 1

Line 6, after "surfaces" please insert--,--.

Line 10, please delete "extensions" and substitute--extending--.

Line 11, after "space" please insert--,--.

Line 12, please delete the first occurrence of "a" and substitute--an--.

Line 20, after "tion" please insert--,--.

Line 24, please delete "surfaces" and substitute--surface--.

Line 40, please delete the second occurrence of "seal body".

Line 43, after "surfaces" please insert--;--.

Line 49, after the second occurrence of "surface" please insert--,--.

Line 50, please delete "aid" and substitute--said--.

UNITED STATES PATENT AND TRADEMARK OFFICE
CERTIFICATE OF CORRECTION

PATENT NO. : 4,805,919

DATED : February 21, 1989

INVENTOR(S) : John M. Wiblyi and John Rizzi

It is certified that error appears in the above-identified patent and that said Letters Patent is hereby corrected as shown below:

Column 8

Line 1, please delete "form" and substitute --from--.

Line 3, after the second occurrence of "surface" please insert --,--.

Line 5, after "portion" please insert --;--.

Signed and Sealed this

Fifteenth Day of August, 1989

*Attest:*

DONALD J. QUIGG

*Attesting Officer*      *Commissioner of Patents and Trademarks*